(12) United States Patent
Woolf

(10) Patent No.: US 9,415,647 B2
(45) Date of Patent: Aug. 16, 2016

(54) ADJUSTABLE HEIGHT HITCH APPARATUS

(71) Applicant: TeleSwivel, LLC, Durham, NC (US)

(72) Inventor: William David Woolf, Durham, NC (US)

(73) Assignee: TeleSwivel, LLC, Durham, NC (US)

( * ) Notice: Subject to any disclaimer, the term of this patent is extended or adjusted under 35 U.S.C. 154(b) by 0 days.

(21) Appl. No.: 14/552,916

(22) Filed: Nov. 25, 2014

(65) Prior Publication Data

US 2015/0158356 A1 Jun. 11, 2015

Related U.S. Application Data

(60) Provisional application No. 61/914,167, filed on Dec. 10, 2013.

(51) Int. Cl.
*B60D 1/46* (2006.01)

(52) U.S. Cl.
CPC ........................................ *B60D 1/46* (2013.01)

(58) Field of Classification Search
CPC .............. B60D 1/02; B60D 1/14; B60D 1/18; B60D 1/46; B60D 1/565
USPC ........... 280/515, 504, 506, 507, 416.1, 416.3, 280/415.2, 480, 490.1
See application file for complete search history.

(56) References Cited

U.S. PATENT DOCUMENTS

| | | | | |
|---|---|---|---|---|
| 2,180,558 A | * | 11/1939 | Stastny | 411/342 |
| 2,856,806 A | * | 10/1958 | Gibbons, Jr. | 411/341 |
| 2,878,036 A | * | 3/1959 | Simmons | 280/485 |
| 3,035,856 A | * | 5/1962 | Mleczko et al. | 280/490.1 |
| 3,655,221 A | * | 4/1972 | Warner | 280/490.1 |
| 3,823,962 A | * | 7/1974 | Martin, Jr. | B60D 1/04 280/491.5 |
| 4,382,609 A | * | 5/1983 | Hemmings | B60D 1/50 280/416.2 |
| 6,341,795 B1 | * | 1/2002 | Zerkel | 280/490.1 |
| 7,669,878 B1 | * | 3/2010 | Williams, Jr. | 280/507 |
| 9,010,796 B2 | * | 4/2015 | Eckhart et al. | 280/515 |
| 9,150,068 B2 | * | 10/2015 | de Kock | B60D 1/52 |
| 2009/0295123 A1 | * | 12/2009 | Good | 280/490.1 |
| 2010/0013189 A1 | * | 1/2010 | Pollock et al. | 280/490.1 |
| 2013/0234414 A1 | * | 9/2013 | Sims | 280/490.1 |

FOREIGN PATENT DOCUMENTS

| | | | |
|---|---|---|---|
| CH | 191380 | * | 6/1937 |
| CH | 208668 | * | 2/1940 |
| EP | 2080644 | * | 7/2009 |
| EP | 2080664 | * | 7/2009 |
| FR | 2623447 | * | 5/1989 |

* cited by examiner

*Primary Examiner* — Anne Marie Boehler
(74) *Attorney, Agent, or Firm* — Myers Bigel & Sibley

(57) ABSTRACT

An adjustable height hitch apparatus for a trailer includes a base having opposite first and second end portions. An elongated shaft extends outwardly from the base first end portion, and an elongated height adjustment member is attached to the base second end portion. A coupling apparatus, such as a lunette ring, is supportable by the height adjustment member via one or more fasteners at any of a plurality of elevations. The height adjustment member is configured to provide height adjustment for the coupling apparatus of at least about eight inches.

11 Claims, 5 Drawing Sheets

ADJUSTABLE HEIGHT HITCH APPARATUS

RELATED APPLICATION

This application claims the benefit of and priority to U.S. Provisional Patent Application No. 61/914,167 filed Dec. 10, 2013, the disclosure of which is incorporated herein by reference as if set forth in its entirety.

FIELD OF THE INVENTION

The present invention relates generally to towing and, more particularly, to hitch apparatus for towing.

BACKGROUND

A lunette ring is a type of trailer hitch that works in combination with a pintle hook on a towing vehicle. The U.S. Military utilizes pintle hooks and lunette rings in various towing applications because they may provide a more secure coupling, particularly over rough terrain, as compared with conventional ball-type trailer hitches.

Typically, a military hitch apparatus utilizing a lunette ring has an offset configuration that enables two height positions of the lunette ring. For example, FIG. 1 illustrates a military trailer T having a lunette ring hitch apparatus 10 secured thereto. The illustrated hitch apparatus 10 includes a ring coupler 12 secured to the trailer T via a tapered shaft (not shown). An offset member 14 connects the ring coupler 12 to the tapered shaft. The illustrated hitch apparatus 10 is designed to be adjustable between two heights. In the illustrated configuration of FIG. 1, the offset member 14 of the hitch apparatus 10 is oriented such that the ring coupler 12 is at its highest position relative to the ground G. In order to lower the height of the ring coupler 12, a person loosens the lunette ring (e.g., by loosening a nut threadingly engaged to the tapered shaft) and rotates the hitch apparatus 10 by one hundred eighty degrees (180°). This lowers the height of the ring coupler 12 relative to the ground, typically by about six inches (6 in.).

Unfortunately, it may be difficult to rotate a conventional lunette ring hitch apparatus in the field. Typically, the press-fit of the tapered shaft to a trailer frame may make rotation of the hitch apparatus very difficult. In addition, the nut securing the shaft to the trailer may be rusted due to exposure to the elements, and may be difficult to loosen.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to some embodiments of the present invention, an adjustable height hitch apparatus for trailers, such as military trailers, includes a base having opposite first and second end portions. An elongated shaft extends outwardly from the base first end portion, and an elongated height adjustment member is attached to the base second end portion. A coupling apparatus, such as a lunette ring, is supportable by the height adjustment member via one or more fasteners at any of a plurality of elevations. In some embodiments, the height adjustment member is configured to provide height adjustment for the coupling apparatus of at least about eight inches (8 in.), however, various height adjustments are possible.

The shaft is configured to be secured to the frame of a trailer. For example, in some embodiments, the shaft has a threaded distal free end configured to receive a correspondingly threaded nut thereon to secure the shaft to the trailer frame. In some embodiments, the shaft has a conically tapered surface that is configured to engage with an internally tapered receiving member of the trailer frame.

In some embodiments, the base is configured to cooperate with a portion of the trailer frame to prevent axial rotation of the shaft when the hitch apparatus is secured to the trailer frame. For example, the base can have a generally rectangular cross-sectional configuration, and a surface of the base cooperates with a portion of the trailer frame to prevent axial rotation of the shaft. In some embodiments, the base is configured to cooperate with a portion of a trailer frame receiving member with which the shaft is engaged.

In some embodiments, a trailer frame receiving member may include a lip extending outwardly therefrom, and the base may be configured to cooperate with the lip to prevent axial rotation of the shaft when the shaft is engaged with the trailer frame receiving member.

In some embodiments, the height adjustment member includes a rear wall secured to the base and opposing, elongated side walls extending outwardly from the rear wall in adjacent, spaced-apart relationship. Each side wall includes a plurality of vertically spaced apertures formed therethrough. The coupling apparatus includes a support member configured to be inserted between the spaced-apart side walls and includes at least one passageway formed therethrough. A fastener, such as a pin, rod, bolt, etc., is inserted through each passageway when aligned with respective apertures in the height adjustment member side walls to secure the coupling apparatus to the height adjustment member. In some embodiments, the coupling apparatus support member includes a pair of spaced-apart passageways. Each passageway is configured to align with respective apertures in the height adjustment member side walls, and a respective fastener is inserted through each respective passageway and the side walls via the corresponding aligned apertures.

In some embodiments, one or more lanyards are secured to the hitch apparatus. Each lanyard includes a free end having a device configured to removably engage a respective fastener and prevent unwanted/inadvertent removal of the fastener from the height adjustment member.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate some exemplary embodiments. The drawings and description together serve to fully explain the exemplary embodiments.

DETAILED DESCRIPTION

Figure 1:
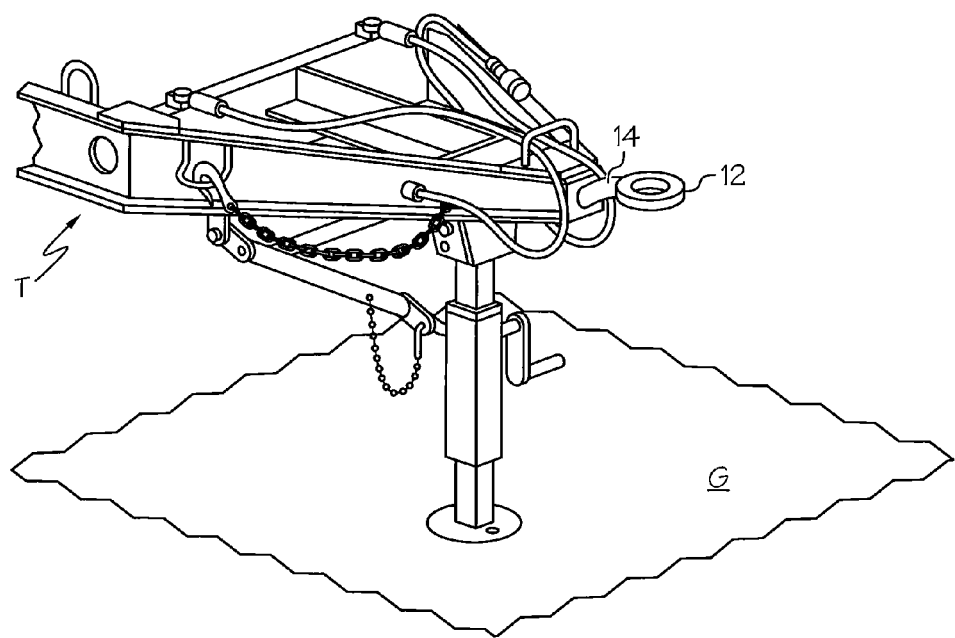
FIG. 1 is a perspective view of a portion of a military trailer having a conventional lunette ring hitch apparatus.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity, and broken lines illustrate optional features or elements unless specified otherwise. In addition, the sequence of operations (or steps) is not limited to the order presented in the figures and/or claims unless specifically indicated otherwise. Features described with respect to one figure or embodiment can be associated with another embodiment or figure although not specifically described or shown as such.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that although the terms first and second are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

The term "about", as used herein with respect to a value or number, means that the value or number can vary by +/−20%, +/−10%, +/−5%, +/−1%, +/−0.5%, or even +/−0.1%.

The term "vehicle" includes all types of vehicles including, but not limited to, automobiles, trucks, military vehicles, airplanes, trains, etc., and also includes towed vehicles, such as trailers, and towing vehicles.

Referring now to FIGS. 2-5, an adjustable height hitch apparatus 20, according to some embodiments of the present invention, is illustrated. The hitch apparatus 20 is configured to be installed on a trailer T, such as a military trailer. However, the hitch apparatus 20 can be installed on various other types of trailers as well as other types of towed vehicles. In FIGS. 2-5, only a portion of a trailer T is illustrated and is referred to as 100.

The illustrated hitch apparatus 20 includes a base 30 having opposite first and second end portions 30a, 30b. An elongated shaft 40 (FIG. 3) extends outwardly from the base first end portion 30a, and an elongated height adjustment member 50 is attached to the base second end portion 30b. A coupling apparatus 60, such as a lunette ring, is supported by the height adjustment member 50 via one or more fasteners F at any of a plurality of user selected elevations. In some embodiments, the height adjustment member 50 is configured to provide height adjustment for the coupling apparatus 60 of at least about eight inches (8 in.) However, various other heights and ranges of heights may be possible based on the size and configuration of the height adjustment member 50. Fasteners F may be various types of devices including bolts, rods, pins, clips, etc., as described below.

Figure 3:
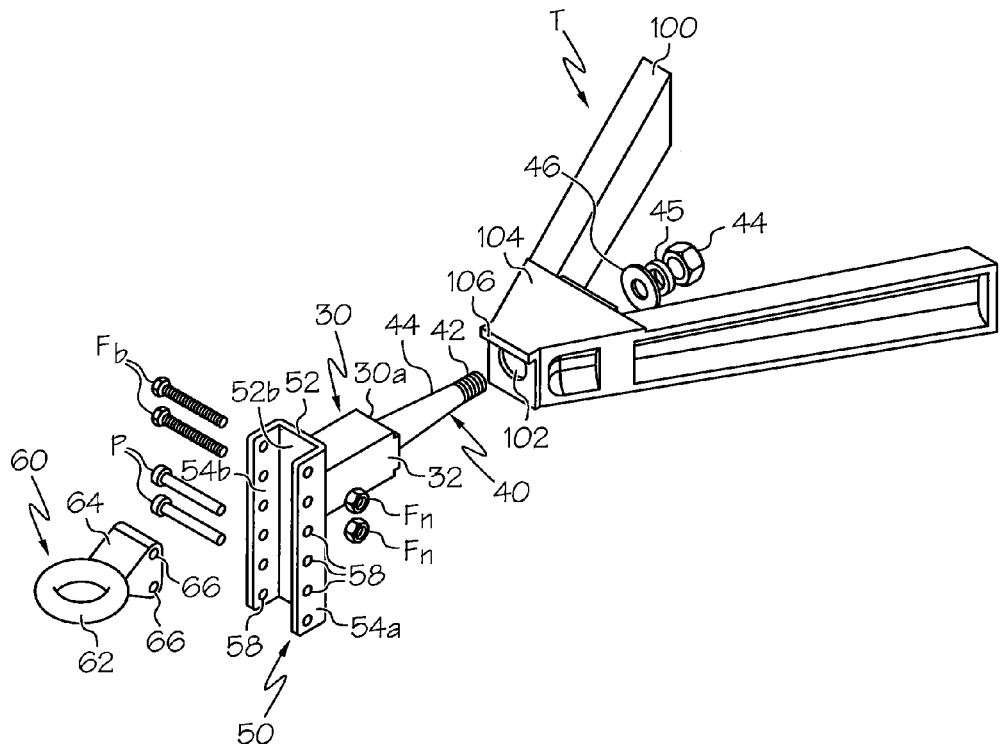
FIG. 3 is an exploded front perspective view of the hitch apparatus of FIG. 2.

Referring to FIG. 3, the shaft 40 is configured to be secured to the frame 100 of a trailer T. The illustrated shaft 40 is configured to be inserted within a bore 102 of a receiving member 104 of the trailer frame 100 and has a threaded distal free end 42 that is configured to receive a correspondingly threaded nut 44 thereon to secure the shaft 40 to the trailer frame 100. The illustrated shaft 40 has a conically tapered surface 44 that engages with the receiving member 104 to create a press fit, as would be understood by one skilled in the art. In some embodiments, the receiving member 104 may have an internally tapered bore that receives at least a portion of the tapered surface 44 of the shaft 40. In the illustrated embodiment, the distal end 42 extends through the receiving member 104 with sufficient length to receive the nut 44, lock washer 45, and washer 46, to thereby secure the hitch apparatus 20 to the trailer frame 100.

The base 30 and shaft 40 may be an integral unit (i.e., the base 30 and shaft 40 may be formed from a single piece of material). In other embodiments, the base 30 and shaft 40 may be separate elements that are secured together via welding. In other embodiments, fasteners (e.g., bolts, screws, threaded rods, rivets, etc.) may be utilized to secure the base 30 and shaft 40 together. Moreover, in some embodiments, a combination of fasteners and welding may be utilized, as would be understood by those skilled in the art.

The illustrated base 30 has a generally rectangular cross-sectional configuration, although other configurations (e.g., cylindrical, hexagonal, etc.) are possible. In the illustrated embodiment, the upper surface 32 of the base cooperates with a lip 106 extending outwardly from the receiving member 104 to prevent axial rotation of the shaft 40 (and hitch apparatus 20) when the hitch apparatus 20 is secured to the trailer frame 100. Embodiments of the present invention, however, are not limited to the illustrated configuration of the base 30 or the illustrated way in which the base 30 and receiving member 104 cooperate to prevent rotation of the shaft 40 (and hitch apparatus 20). Various other ways of preventing rotation may be utilized.

The illustrated height adjustment member 50 has an elongated, generally "U"-shaped configuration with a rear wall 52 and side walls 54a, 54b extending outwardly therefrom in adjacent, spaced-apart relationship. The rear wall 52 has opposite first and second sides 52a, 52b, and the rear wall first side 52a is secured to the base second end 30b, for example via welding. In the illustrated embodiment, a gusset 56 is secured to the base 30 and rear wall first side 52a to provide additional stability and strength to the height adjustment member 50. In other embodiments, fasteners (e.g., bolts, screws, threaded rods, rivets, etc.) may be utilized to secure the height adjustment member 50 and the base 30 together. Moreover, in some embodiments, a combination of fasteners and welding may be utilized, as would be understood by those skilled in the art The illustrated gusset 56 includes an aperture 56a that may be utilized to support one or more pin/clip-retaining lanyards, as described below with respect to FIGS. 6-8.

Figure 2:
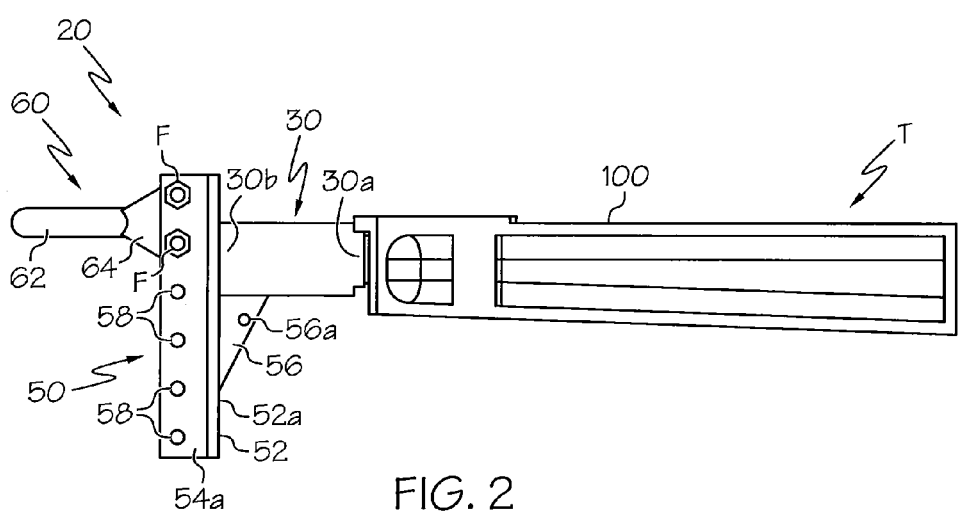
FIG. 2 is a side view of an adjustable height hitch apparatus secured to a trailer frame, according to some embodiments of the present invention.
Figure 4:
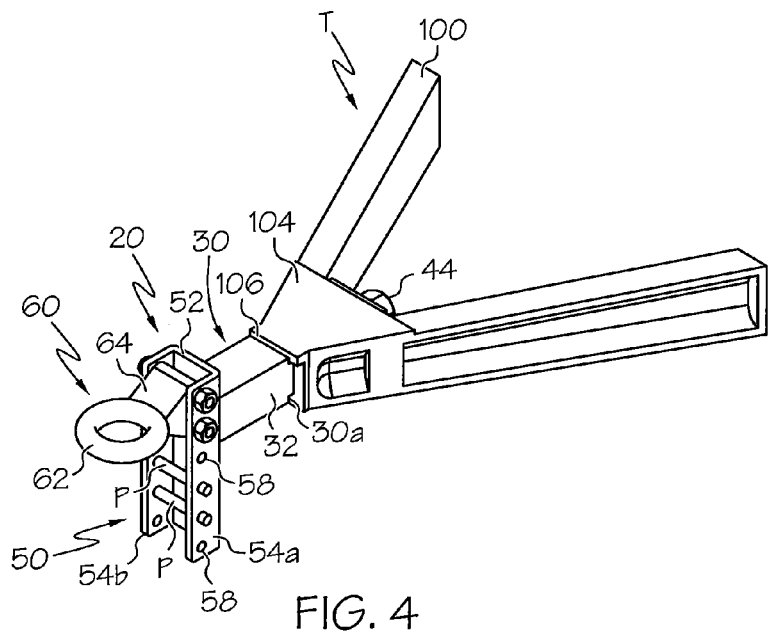
FIG. 4 is a front perspective view of the hitch apparatus of FIG. 2.
Figure 5:
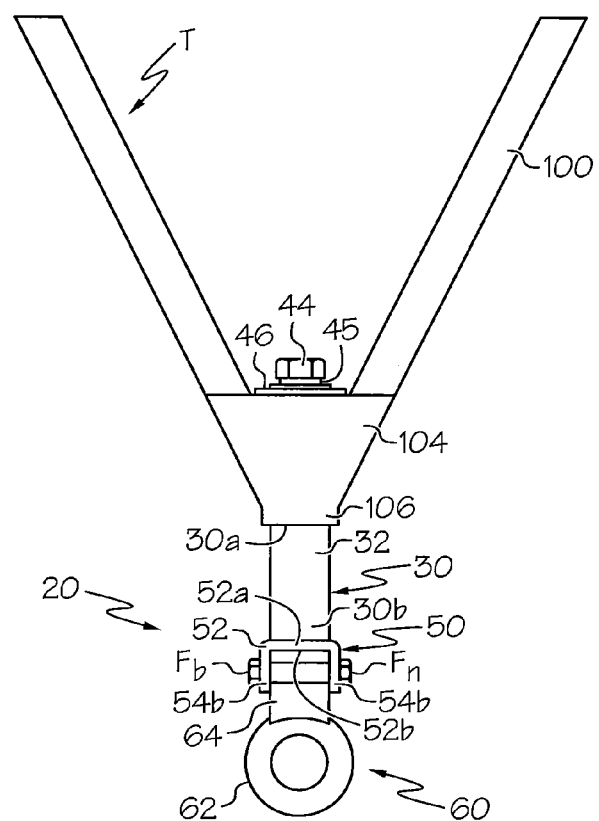
FIG. 5 is a top plan view of the hitch apparatus of FIG. 2.

The side walls 54a, 54b of the height adjustment member 50 extend outwardly from the rear wall second side 52b and each have a plurality of vertically spaced apertures 58 formed therethrough. The illustrated coupling apparatus 60 includes a lunette ring 62 connected to a support member 64. The support member 64 is configured to be inserted between the spaced-apart side walls 54a, 54b of the height adjustment member 50 and includes a pair of passageways 66 formed therethrough. The passageways 66 are configured to align with respective apertures 58 in the height adjustment member side walls 54a, 54b, and a fastener F, such as a pin, rod, bolt, etc., is inserted through each passageway 66 when aligned with respective apertures 58 in the height adjustment member side walls 54a, 54b to secure the coupling apparatus 60 to the height adjustment member 50, as illustrated in FIGS. 2 and 4. In the illustrated embodiment, the fasteners F utilized to secure the coupling apparatus 60 to the height adjustment member 50 are threaded bolts $F_b$ and nuts $F_n$. Also illustrated, but not utilized in the illustrated embodiment, are pins P, which may allow the coupling apparatus 60 to be secured to the height adjustment member 50. The pins P allow the coupling apparatus 60 to be adjusted in height without requiring the use of tools.

The various components of the hitch apparatus 20 (e.g., the base, 30, shaft 40, height adjustment member 50, coupling apparatus 60) can be formed from various materials known to those skilled in the art. An exemplary material includes, but is not limited to, case-hardened steel.

Embodiments of the present invention are not limited to the illustrated shape and configuration of the various components of the hitch apparatus 20 (e.g., the base, 30, shaft 40, height adjustment member 50, coupling apparatus 60). Various shapes and configurations for these elements may be utilized.

Figure 6:
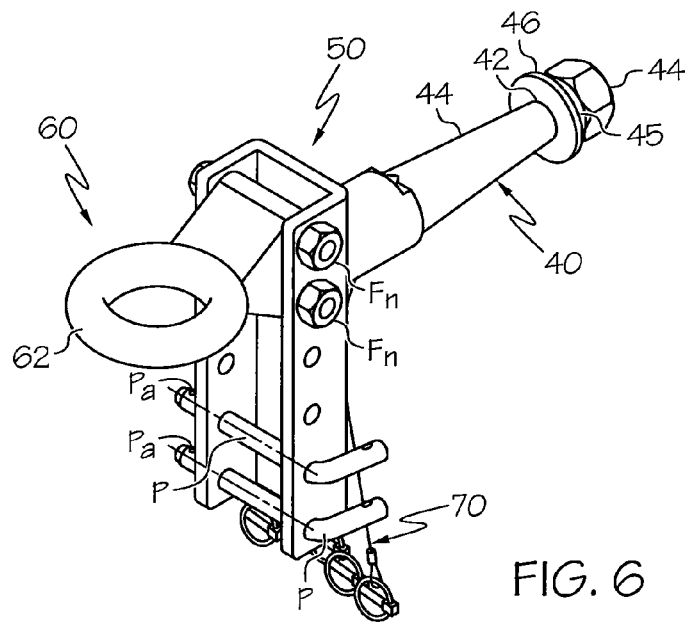
FIG. 6 is a front perspective view of the adjustable height hitch apparatus of FIG. 2 with a plurality of pin/clip-retaining lanyards secured thereto, according to some embodiments of the present invention.
Figure 7:
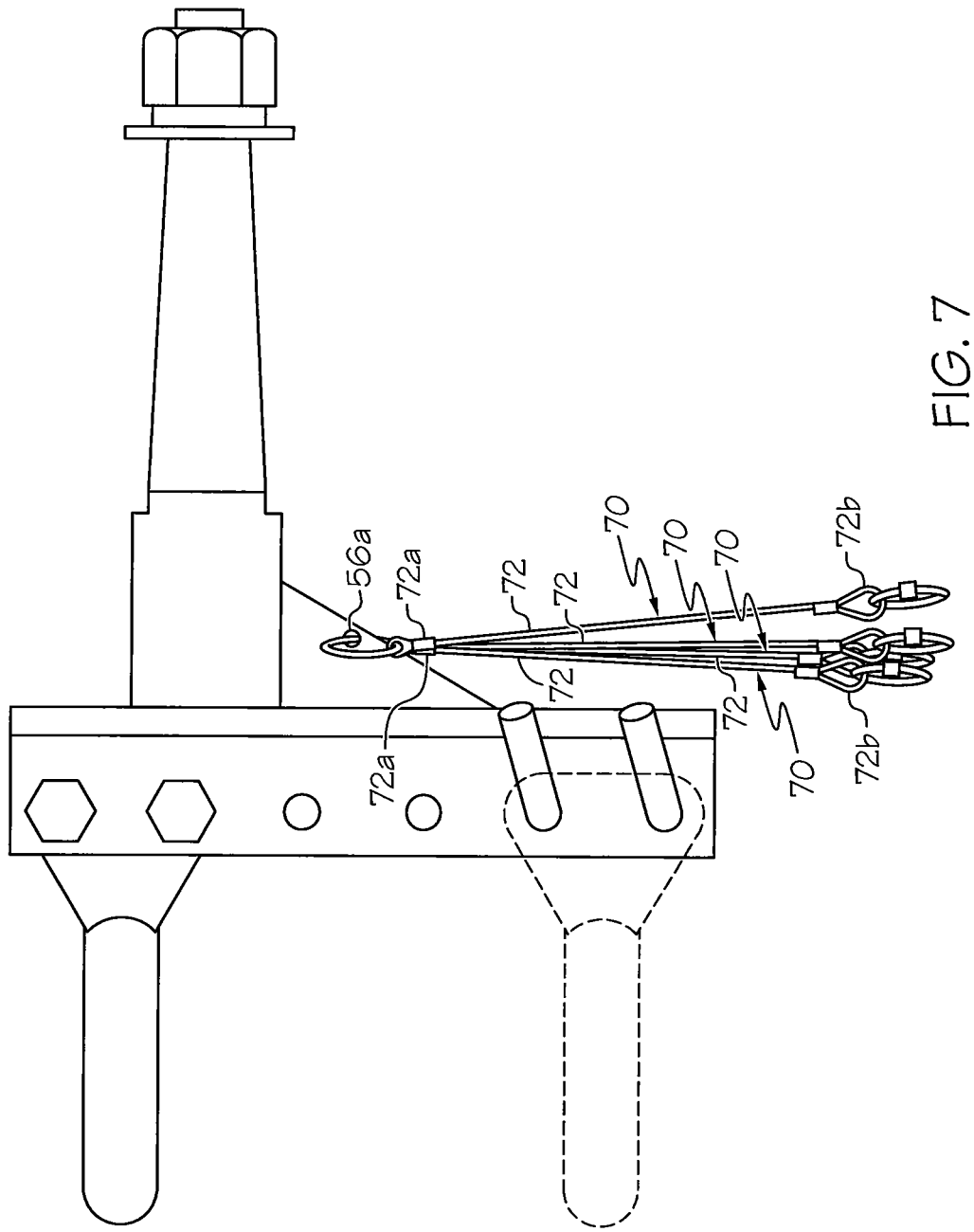
FIG. 7 is a side view of the hitch apparatus of FIG. 6 illustrating the lanyards secured to the hitch apparatus gusset.
Figure 8:
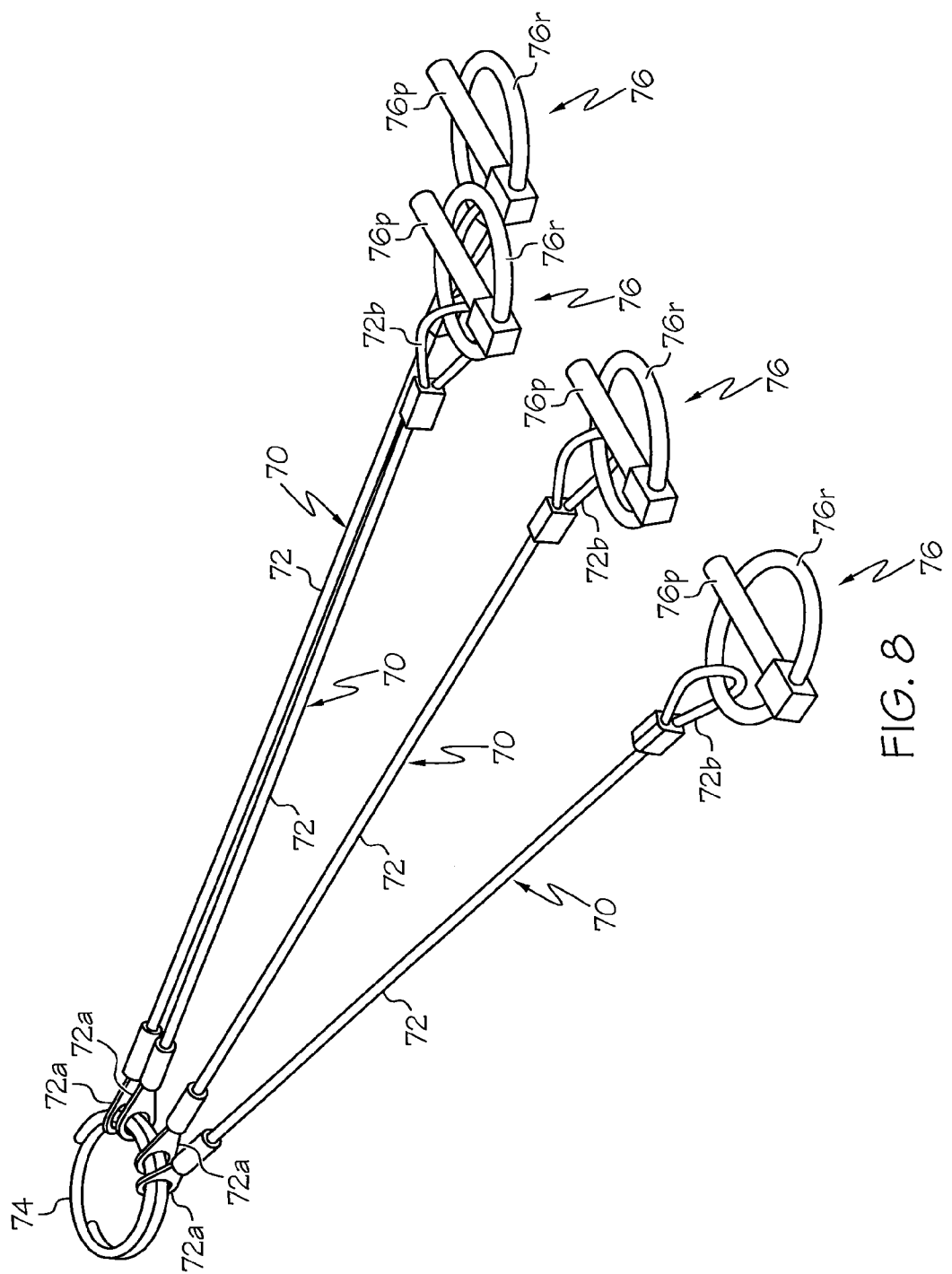
FIG. 8 is a perspective view of the lanyards attached to the hitch apparatus of FIG. 6, according to some embodiments of the present invention.

Referring to FIGS. 6-8, a hitch apparatus 20, according to embodiments of the present invention, can include one or more pin/clip-retaining lanyards 70. Each lanyard 70 includes an elongated cord 72 (e.g., wire cord, polymer cord, etc.) having opposite end portions 72a, 72b. End portions 72a are secured to a ring 74 (e.g., a key ring), which is, in turn, secured to the gusset 56 via aperture 56a formed therethrough (FIG. 7). Lanyard end portions 72b are secured to devices 76 that can be used to prevent pins P from unwanted/inadvertent removal from the height adjustment member 50. Each illustrated device 76 includes a retaining pin 76p that is configured to be inserted through an aperture Pa in a respective pin P (FIG. 6). As would be understood by one skilled in the art, each retaining pin 76p prevents unwanted or inadvertent removal of the pin P from the height adjustment member 50. A ring 76r is attached to each retaining pin 76p to facilitate removal of the retaining pin 76p, for example, via a finger. Each lanyard 70 serves the purpose of preventing a respective retaining pin 76p from becoming lost. As such, retaining pins 76p needed to secure pins P in a hitch apparatus 20 are always attached to the hitch apparatus 20 via the lanyards 70.

Various types of devices may be utilized to prevent unwanted/inadvertent removal of a pin P and may be supported via a lanyard in accordance with embodiments of the present invention. Moreover, embodiments of the present invention are not limited to the illustrated ring 74 for securing the lanyards 70 to the hitch apparatus 20. Various ways of securing one or more lanyards 70 to the hitch apparatus 20 may be utilized.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A trailer, comprising:
   a frame comprising a receiving member with an internal bore;
   a lip extending outwardly from the receiving member, wherein the lip is spaced apart from an opening of the internal bore; and
   an adjustable height hitch apparatus, comprising:
     a base comprising opposite first and second end portions;
     an elongated shaft extending outwardly from the base first end portion, wherein the shaft extends through the receiving member internal bore via the opening, wherein the shaft comprises a threaded distal free end, and wherein a correspondingly threaded nut is threadingly engaged with the shaft distal free end to secure the shaft to the trailer frame, wherein the base first end portion abuts the receiving member without engaging the internal bore, and wherein a portion of the base cooperates with the lip extending outwardly from the receiving member to prevent any axial rotation of the shaft;
     an elongated height adjustment member attached to the base second end portion; and
     a coupling apparatus supported by the height adjustment member, wherein the height adjustment member is configured to support the coupling apparatus at a plurality of elevations.

2. The trailer of claim 1, wherein the shaft comprises a conically tapered surface configured to engage with the internal bore of the receiving member of the trailer frame to create a press fit.

3. The trailer of claim 1, wherein the coupling apparatus is a lunette ring.

4. The trailer of claim 1, wherein the coupling apparatus is supported by the height adjustment member at any of the plurality of elevations via at least one fastener.

5. The trailer of claim 4:
   wherein the height adjustment member comprises a rear wall and opposing, elongated side walls extending outwardly from the rear wall in adjacent, spaced-apart relationship, and wherein each side wall includes a plurality of vertically spaced apertures formed therethrough;
   wherein the coupling apparatus comprises a support member having at least one passageway formed therethrough; and
   wherein the at least one fastener is engagable with the at least one passageway when aligned with respective apertures in the height adjustment member side walls.

6. The trailer of claim 5, wherein the at least one passageway comprises a pair of spaced-apart passageways, and wherein the at least one fastener comprises a pair of fasteners, each fastener engagable with a respective one of the passageways when aligned with respective apertures in the height adjustment member side walls.

7. The trailer of claim 4, wherein the at least one fastener is selected from the group consisting of pins, rods, and bolts.

8. The trailer of claim 4, further comprising a lanyard secured to the hitch apparatus, wherein the lanyard comprises a free end having a device configured to removably engage a fastener and prevent unwanted removal of the fastener from the height adjustment member.

9. The trailer of claim 1, wherein the height adjustment member is configured to provide height adjustment for the coupling apparatus of at least about eight inches (8 in.).

10. The trailer of claim 1, wherein the base has a generally rectangular cross-sectional configuration.

11. The trailer of claim 1, wherein the coupling apparatus is supported by the height adjustment member at any of the plurality of elevations via a plurality of fasteners, and further comprising a respective plurality of lanyards secured to the hitch apparatus, each lanyard comprising a free end having a device configured to removably engage a respective fastener and prevent unwanted removal of the fastener from the height adjustment member.

\* \* \* \* \*